United States Patent
Kwon et al.

(10) Patent No.: US 11,139,493 B2
(45) Date of Patent: Oct. 5, 2021

(54) METHOD AND SYSTEM FOR CONTROLLING HYDROGEN PURGING OF FUEL CELL

(71) Applicants: Hyundai Motor Company, Seoul (KR); Kia Motors Corporation, Seoul (KR)

(72) Inventors: Soon Woo Kwon, Gyeonggi-do (KR); Joon Yong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 358 days.

(21) Appl. No.: 15/825,766

(22) Filed: Nov. 29, 2017

(65) Prior Publication Data

US 2019/0067715 A1 Feb. 28, 2019

(30) Foreign Application Priority Data

Aug. 28, 2017 (KR) ........................ 10-2017-0108698

(51) Int. Cl.
*H01M 8/0444* (2016.01)
*H01M 8/04992* (2016.01)
(Continued)

(52) U.S. Cl.
CPC ..... *H01M 8/0444* (2013.01); *H01M 8/04089* (2013.01); *H01M 8/04231* (2013.01);
(Continued)

(58) Field of Classification Search
CPC ... H01M 8/04; H01M 8/04082–04268; H01M 8/04298–0447; H01M 8/04537–04656; H01M 8/04694–04805
See application file for complete search history.

(56) References Cited

U.S. PATENT DOCUMENTS

2006/0216557 A1* 9/2006 Miyamoto ........ H01M 8/04619
429/431
2009/0136793 A1* 5/2009 Kanno .............. H01M 8/04097
429/483
(Continued)

FOREIGN PATENT DOCUMENTS

JP 2004-185974 A 7/2004
JP 2006-079891 A 3/2006
(Continued)

OTHER PUBLICATIONS

Cha, S (2016). Fuel Cell Fundamentals. (3rd ed.) (pp. 272-294, 346, 431-449) (Year: 2016).*
(Continued)

*Primary Examiner* — Jonathan Crepeau
*Assistant Examiner* — Jacob Buchanan
(74) *Attorney, Agent, or Firm* — Mintz Levin Cohn Ferris Glovsky and Popeo, P.C.; Peter F. Corless (57) ABSTRACT

A system and method for controlling hydrogen purging of a fuel cell are provided. The method includes calculating a hydrogen supply amount and estimating a hydrogen consumption amount. An estimated hydrogen concentration is
(Continued)

then corrected when a difference between the calculated hydrogen supply amount and the estimated hydrogen use amount is greater than a predetermined threshold value.

12 Claims, 4 Drawing Sheets

(51) Int. Cl.
*H01M 8/04089* (2016.01)
*H01M 8/0438* (2016.01)
*H01M 8/0432* (2016.01)
*H01M 8/04664* (2016.01)
*H01M 8/04223* (2016.01)
*H01M 8/04537* (2016.01)

(52) U.S. Cl.
CPC ... *H01M 8/04373* (2013.01); *H01M 8/04388* (2013.01); *H01M 8/04425* (2013.01); *H01M 8/04432* (2013.01); *H01M 8/04447* (2013.01); *H01M 8/04589* (2013.01); *H01M 8/04679* (2013.01); *H01M 8/04992* (2013.01)

(56) References Cited

U.S. PATENT DOCUMENTS

| | | | | |
|---|---|---|---|---|
| 2010/0040922 | A1* | 2/2010 | Katano | F16K 31/0651 429/423 |
| 2011/0087441 | A1* | 4/2011 | Salvador | H01M 8/04303 702/24 |
| 2012/0038373 | A1* | 2/2012 | Ikeda | H01M 8/04447 324/691 |
| 2017/0084941 | A1* | 3/2017 | Cai | H01M 8/04305 |

FOREIGN PATENT DOCUMENTS

| | | |
|---|---|---|
| JP | 2006-221980 A | 8/2006 |
| JP | 2006-324058 A | 11/2006 |
| JP | 2012-064486 A | 3/2012 |
| JP | 5155997 B2 | 3/2013 |
| JP | 5502553 B2 | 5/2014 |
| JP | 2016-103465 A | 6/2016 |
| KR | 10-1459815 B1 | 11/2014 |

OTHER PUBLICATIONS

Machine Translation of Morita, JP 2012-064486, originally published Mar. 29, 2012. (Year: 2012).*

* cited by examiner

FIG. 1

RELATED ART

METHOD AND SYSTEM FOR CONTROLLING HYDROGEN PURGING OF FUEL CELL

CROSS REFERENCE TO RELATED APPLICATION

The present application claims priority to Korean Patent Application No. 10-2017-0108698, filed Aug. 28, 2017, the entire contents of which is incorporated herein for all purposes by this reference.

BACKGROUND

1. Field of the Invention

The present invention relates to a method and a system for controlling hydrogen purging of a fuel cell and, more particularly, to a method and a system for controlling hydrogen purging by estimating a hydrogen concentration in a hydrogen recirculating line of a fuel cell.

2. Description of the Prior Art

In general, a fuel cell converts chemical energy into electrical energy through a redox reaction between hydrogen and oxygen respectively supplied from a hydrogen supply device and an air supply device, and includes a fuel cell stack that produces electrical energy and a cooling system that cools the fuel cell stack. In other words, hydrogen is supplied to an anode side of a fuel cell stack and at the anode, hydrogen undergoes oxidation reactions to generate protons and electrons. The generated protons and electrons flow from the anode to the cathode through an electrolyte membrane and a separator, respectively. At the cathode, the protons and electrons drawn from the anode participate in an electrochemical reaction with oxygen in air, forming water. Such a flow of electrons produces electric energy.

Among others, hydrogen supplied to an anode side of a fuel cell stack should be maintained at an appropriate hydrogen concentration level, which requires a hydrogen purging control in the hydrogen recirculating line. Hydrogen purging control is generally performed by maintaining an appropriate hydrogen concentration in response to the real-time estimation of a hydrogen concentration. However, since parameters for estimating a hydrogen concentration are defaulted based on an initial state, and thus are not corrected, the parameters, if not corrected, are unable to reflect at all the conditions which changed with the deterioration of the fuel cell stack.

Figure 1:
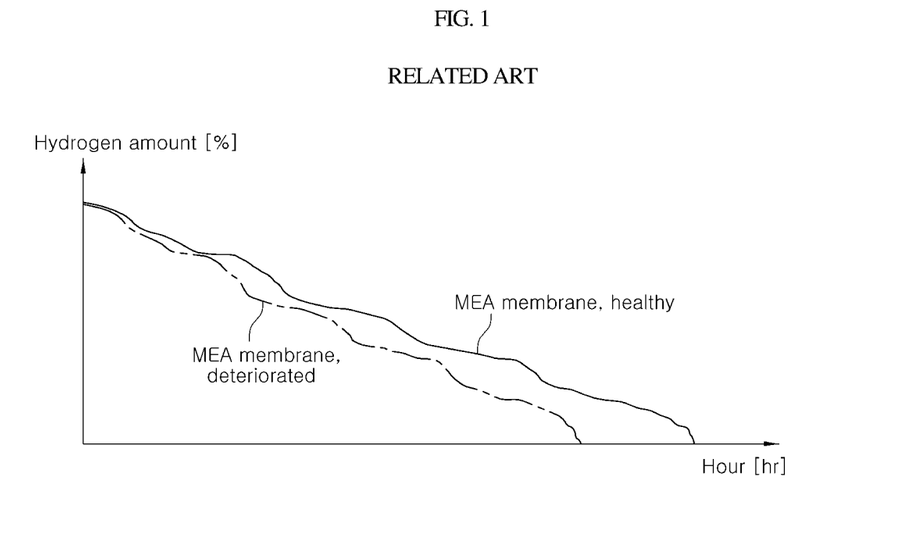
FIG. 1 is a graph showing hydrogen consumption amounts according to the deterioration of fuel cell stacks according to the related art.

FIG. 1 is a graph showing hydrogen consumption amounts according to the deterioration of fuel cell stacks according to the related art. Referring to FIG. 1, hydrogen consumption curves are respectively depicted for a healthy and a deteriorated membrane in a fuel cell membrane electrode assembly (MEA). Compared to a healthy membrane, as shown in the graph, a deteriorated membrane of the fuel cell stack becomes thinner with the deterioration of the stack, thereby increasing the crossover through the MEA, with the consequent acceleration of hydrogen consumption rates.

Therefore, a substantial difference occurs between a hydrogen consumption amount estimated for a hydrogen concentration and an actually consumed hydrogen amount consumed in a fuel cell as a membrane of the fuel cell MEA deteriorates. In other words, when hydrogen concentrations are estimated without considering the phenomenon that the crossover increases with the deterioration of the fuel cell MEA membrane, proper hydrogen concentrations are unable to be maintained. Accordingly, the deterioration is further accelerated when a fuel cell is operated with the supply of a low concentration of hydrogen thereto.

It should be understood that the foregoing description of the background art is merely for the purpose of promoting an understanding of the background of the present invention and is not to be construed as an admission that the prior art is known to those skilled in the art.

SUMMARY

The present invention provides a method and a system for controlling hydrogen purging, in which a diffusion parameter used for estimating a concentration of hydrogen supplied to a fuel cell is corrected to prevent the fuel cell from being operated at a low hydrogen concentration.

According to an aspect of the present invention, a method for controlling hydrogen purging of a fuel cell by estimating a hydrogen concentration may include: calculating a hydrogen supply amount; estimating a hydrogen consumption amount; and correcting an estimated hydrogen concentration when a difference between the calculated hydrogen supply amount and the estimated hydrogen use amount is greater than a predetermined threshold value.

A hydrogen concentration may be estimated based on a diffusion equation according to crossover occurring in a fuel cell. The calculating of a hydrogen supply amount may be executed based on a storage amount in a hydrogen storage system. The storage amount in the hydrogen storage system may be based on a pressure and a temperature in a hydrogen tank. Additionally, the calculating of a hydrogen supply amount and estimating of a hydrogen consumption amount may be performed respectively to calculate a hydrogen supply amount and estimate a hydrogen consumption amount during a period between a first storage amount and a second storage amount which are both pre-established in the hydrogen storage system.

The estimating of a hydrogen consumption amount may be performed by summing an amount of hydrogen reacted in a fuel cell, an amount of hydrogen crossover, and an amount of hydrogen discharged by hydrogen purging. The amount of hydrogen reacted in a fuel cell may be estimated based on a generated current of the fuel cell. The amount of hydrogen crossover may be estimated based on a diffusion equation. The diffusion equation may use the following formulas:

$$n^*_{N2\_XO} = \frac{D_{N2}}{RT} \cdot \frac{P_{Ca,N2} - P_{An,N2}}{\delta} \cdot A; \text{ and}$$

$$n^*_{H2\_XO} = \frac{D_{H2}}{RT} \cdot \frac{P_{An,H2} - P_{Ca,H2}}{\delta} \cdot A,$$

wherein the symbols used are as follows: $n_{N2\_XO}^*$: Nitrogen crossover rate; $n_{H2\_XO}^*$: Hydrogen crossover rate; P: Pressure, [kPa]; R: Gas constant, 8.314 [J/mol/K]; T: Temperature, [K]; D: Diffusion coefficient; A: Catalyst area; and $\delta$: Diffusion distance.

The amount of hydrogen discharged by hydrogen purging may be estimated based on a difference between a pressure of a hydrogen supply line and an external pressure and on an estimated hydrogen concentration. correcting of an estimated hydrogen concentration may be performed to correct a diffusion coefficient of the diffusion equation according to crossover. The diffusion coefficient of the diffusion equation according to crossover may be corrected to further increase as a difference between a calculated hydrogen supply amount and an estimated hydrogen use amount increases.

According to another aspect of the present invention, a system for controlling hydrogen purging of a fuel cell according to the present invention may include: a hydrogen purge valve disposed in a hydrogen recirculating line; and a controller configured to operate the hydrogen purge valve by estimating a hydrogen concentration, wherein the controller may be configured to calculate a hydrogen supply amount, estimate a hydrogen consumption amount, and correct an estimated hydrogen concentration when a difference between the calculated hydrogen supply amount and the estimated hydrogen use amount is greater than a predetermined threshold value.

According to the hydrogen purging control for a fuel cell of the present invention, a concentration of hydrogen supplied to the fuel cell may be predicted more accurately even when a fuel cell stack is deteriorated. In addition, the hydrogen purging control according to the present invention may prevent a fuel cell from operating with hydrogen supplied at a low concentration thereto and thus from being deteriorated in an acceleration pattern, whereby the durability of the fuel cell may be improved.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A specific structural or functional description of embodiments of the present invention disclosed in the specification or application is given merely for the purpose of describing the embodiment according to the present invention. Therefore, the exemplary embodiments according to the present invention may be implemented in various forms, and the present invention should not be construed as being limited to the embodiments described in the specification or application.

Various changes and modifications may be made to the exemplary embodiments according to the present invention, and therefore particular embodiments will be illustrated in the drawings and described in the specification or application. However, it should be understood that exemplary embodiments according to the concept of the present invention are not limited to the particular disclosed embodiments, but the present invention includes all modifications, equivalents, and alternatives falling within the spirit and scope of the present invention. Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present invention.

In the case where an element is referred to as being "connected" or "accessed" to other elements, it should be understood that not only the element is directly connected or accessed to the other elements, but also another element may exist therebetween. Meanwhile, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

In the present specification, unless defined differently, all terms used herein, which include technical terminologies or scientific terminologies, have the same meaning as that generally understood by a person skilled in the art to which the present invention belongs. It should be interpreted that the terms, which are identical to those defined in general dictionaries, have the meaning identical to that in the context of the related technique. The terms should not be ideally or excessively interpreted as having a formal meaning unless not clearly defined.

Hereinafter, an exemplary embodiment of the present invention will be described in detail with reference to the accompanying drawings similar reference numerals presented in the drawings denote similar elements.

Figure 2:
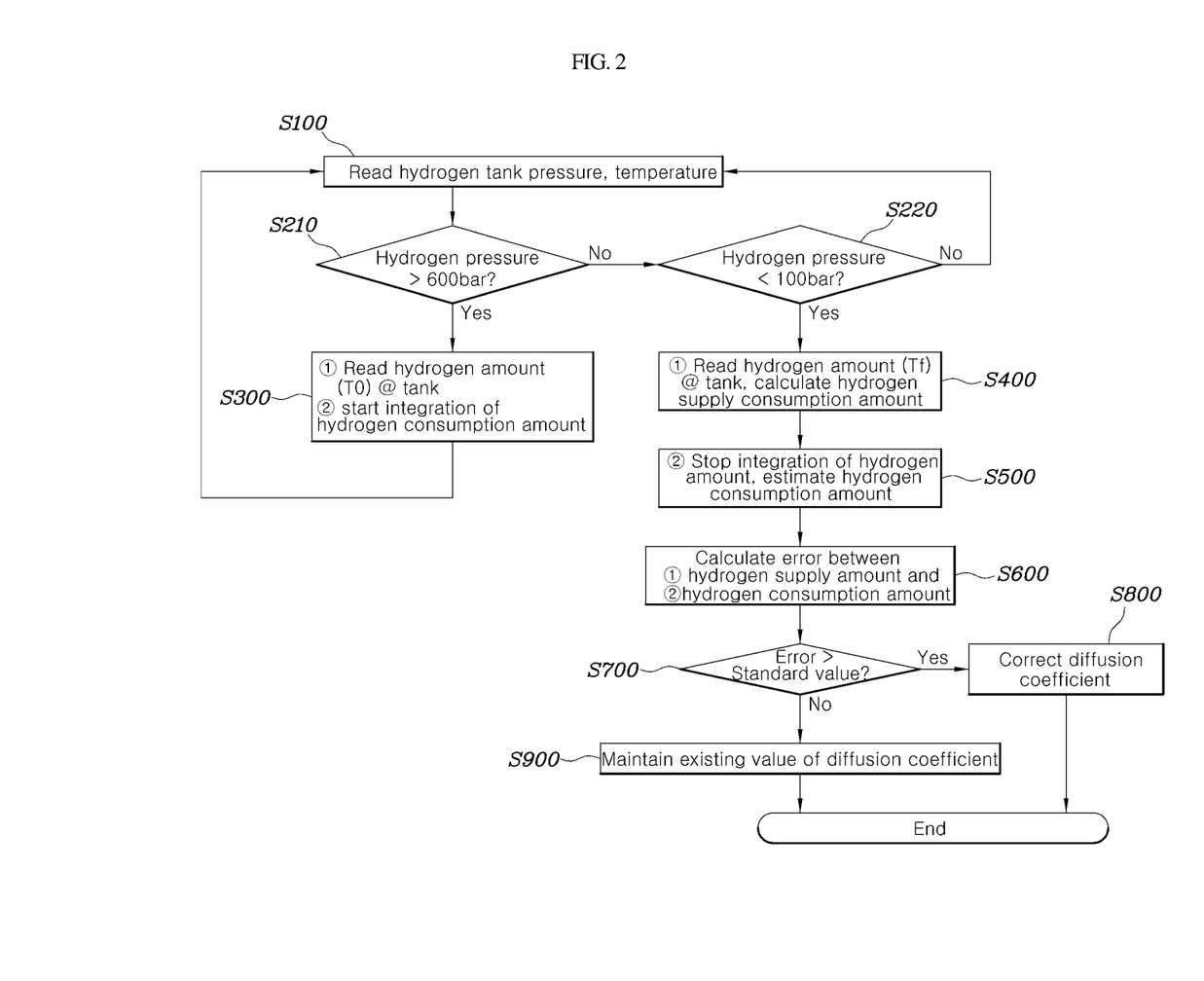
FIG. 2 is a flowchart illustrating a method for controlling hydrogen purging of a fuel cell according to an exemplary embodiment of the present invention.

FIG. 2 is a flowchart illustrating a method for controlling hydrogen purging of a fuel cell according to an exemplary embodiment of the present invention. The method described herein below may be executed by a controller having a processor and a memory. Referring to FIG. 2, a method for controlling hydrogen purging of a fuel cell by estimating a hydrogen concentration according to an exemplary embodiment of the present invention may include: calculating a hydrogen supply amount (S400); estimating a hydrogen consumption amount (S500); and correcting an estimated hydrogen concentration (S800) when a difference between the calculated hydrogen supply amount and the estimated hydrogen use amount is greater than a predetermined threshold value (S700).

For hydrogen purging, a hydrogen concentration may be estimated and a hydrogen purge valve may be opened or closed to regulate the estimated hydrogen concentration to be within a predetermined range. In particular, a purge valve may be operated to be opened for an estimated hydrogen concentration value less than a lower limit, and closed for an estimated hydrogen concentration value greater than an upper limit. A hydrogen concentration of a fuel cell may be estimated, based on crossover levels, purging amounts, etc. of individual gases. As used herein, the term "crossover" refers to gas diffusion through a membrane from a hydrogen electrode to an oxygen electrode or vice versa in a fuel cell stack.

In other words, a hydrogen concentration to be supplied to a hydrogen electrode may be estimated using information from sensors provided in a hydrogen supply system and an air supply system. Such a technique for estimating a hydrogen concentration is well known, thus a detailed description thereof will be omitted. This hydrogen concentration may be estimated based on a diffusion equation according to crossover occurring in a fuel cell. In one exemplary embodiment, the diffusion equation may use the following formulas:

$$n^*_{N2\_XO} = \frac{D_{N2}}{RT} \cdot \frac{P_{Ca,N2} - P_{An,N2}}{\delta} \cdot A; \text{ and}$$

$$n^*_{H2\_XO} = \frac{D_{H2}}{RT} \cdot \frac{P_{An,H2} - P_{Ca,H2}}{\delta} \cdot A,$$

wherein the symbols used are as follows: $n^*_{N2\_XO}$: Nitrogen crossover rate; $n^*_{H2\_XO}$: Hydrogen crossover rate; P: Pressure, [kPa]; R: Gas constant, 8.314 [J/mol/K]; T: Temperature, [K]; D: Diffusion coefficient; A: Catalyst area; and δ: Diffusion distance. The diffusion coefficient D used in the above equation is a parameter which was defaulted at an early stage, and thus does not reflect that a fuel cell stack deteriorates to make the membrane thinner and thus to increase the diffusion rate. In the present invention, therefore, the diffusion coefficient may be corrected according to the deterioration of a fuel cell stack.

In the calculating of a hydrogen supply amount (S400), a hydrogen supply amount from a hydrogen storage system to a fuel cell may be calculated. The hydrogen storage system may include a hydrogen tank or the like. Specifically, a hydrogen supply amount may be calculated, based on a storage amount in the hydrogen storage system. In other words, a change of the hydrogen amount stored in the hydrogen storage system may be calculated as a hydrogen supply amount. The storage amount in the hydrogen storage system may be estimated based on pressures and temperatures in the hydrogen tank (S100).

Figure 3:
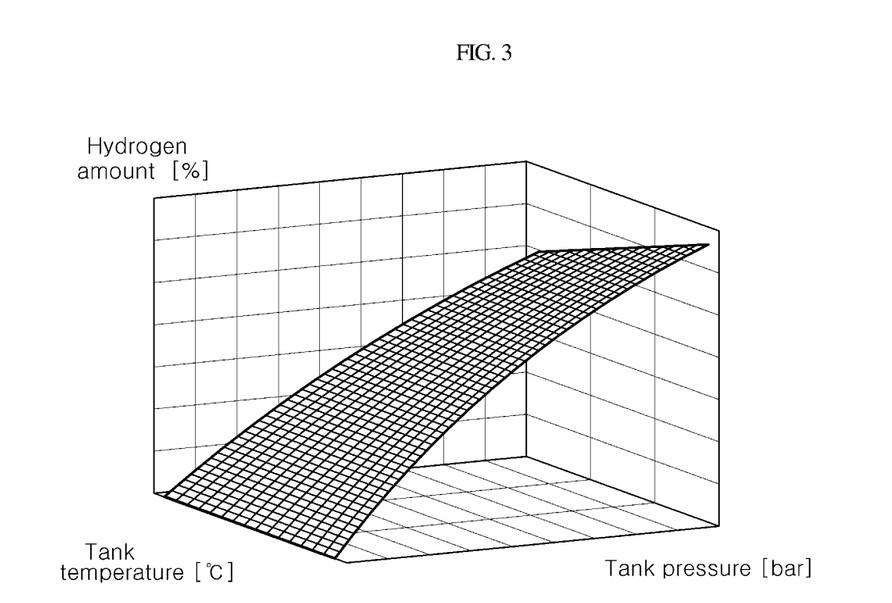
FIG. 3 shows a map of hydrogen storage amounts against pressures and temperatures in a fuel cell hydrogen tank according to an exemplary embodiment of the present invention.

FIG. 3 shows a map of hydrogen storage amounts against pressures and temperatures in a fuel cell hydrogen tank according to an exemplary embodiment of the present invention. With further reference of FIG. 3, as shown, storage amounts that correspond to pressures and temperatures in the hydrogen tank are pre-stored in a map. When a pressure and a temperature in the hydrogen tank are measured by a pressure sensor and a temperature sensor both disposed in the hydrogen tank, a hydrogen storage amount in the hydrogen tank may be estimated.

The calculating of a hydrogen supply amount (S400) and estimating of a hydrogen consumption amount (S500) may be performed respectively to calculate a hydrogen supply amount and estimate a hydrogen consumption amount during a period between a first storage amount and a second storage amount which are both pre-established in the hydrogen storage system. For example, an error may be set to be calculated by calculating or estimating a hydrogen supply amount and a hydrogen consumption amount when the hydrogen system has a storage amount ranging from about 30% to 80%.

In an exemplary embodiment, as shown in FIG. 2, an error may be set to be calculated by calculating or estimating a hydrogen supply amount and a hydrogen consumption amount when the hydrogen tank has a pressure of from about 600 bar to 100 bar. In the measuring of pressures and temperatures in the hydrogen tank (S100), the pressures and temperatures in the hydrogen tank may be continuously measured and whether the pressure in the hydrogen tank is greater than about 600 bar may be determined (S210). When the pressure is greater than about 600 bar, a hydrogen amount (T0) in the hydrogen tank may be calculated and a hydrogen consumption amount in that state starts to be integrated (S300), before returning to the measuring of pressures and temperatures in the hydrogen tank (S100). Accordingly, a hydrogen supply amount and a hydrogen consumption amount may be calculated based on a state nearest to 600 bar among states greater than 600 bar.

When a pressure in the hydrogen tank becomes less than about 600 bar, whether the pressure in the hydrogen tank is less than about 100 bar may be determined (S220). When a pressure in the hydrogen tank is greater than about 100 bar, the process may return again to the measuring of pressures and temperatures in the hydrogen tank (S100). However, when a pressure in the hydrogen tank becomes less than about 100 bar, a hydrogen amount (Tt) in the hydrogen tank in that state may be calculated, a difference between the hydrogen amount (T0) and the hydrogen amount (Tf) in the hydrogen tank may be calculated as a hydrogen supply amount (S400), and the integration of hydrogen consumption amounts may be stopped and a hydrogen consumption amount may be estimated (S500).

In addition, in the estimating of a hydrogen consumption amount (S500), the hydrogen consumption amount may be estimated by summing an amount of hydrogen reacted in a fuel cell, an amount of hydrogen crossover, and an amount of hydrogen discharged by hydrogen purging. An amount of hydrogen reacted in a fuel cell may be estimated based on a generated current of the fuel cell. In other words, the current generated in the fuel cell may be integrated for a predetermined period and the amount of hydrogen reacted in the fuel cell may be estimated based on the integrated current. An amount of hydrogen crossover may be estimated based on the diffusion equation. The amount of hydrogen crossover from a hydrogen electrode to an oxygen electrode in a fuel cell may be estimated by integrating hydrogen crossover rates over time for a predetermined period of time according to the equations described above.

Further, an amount of hydrogen discharged by hydrogen purging may be estimated based on a difference between a pressure in a hydrogen supply line and an external pressure and on an estimated hydrogen concentration. Specifically, hydrogen purging may be performed for the time during which a hydrogen purge valve is open. Therefore, the amount of gas discharged by hydrogen purging may be estimated by integrating a difference between a pressure in the hydrogen supply line and an external pressure for the time during which the hydrogen purge valve is open, and an amount of hydrogen discharged by hydrogen purging may be estimated by further using an estimated hydrogen concentration in the discharged gas.

When a difference between a calculated hydrogen supply amount and an estimated hydrogen use amount is greater than a preset threshold value (S700), an estimated hydrogen concentration may be corrected (S800). In particular, the threshold value may be preset to have an appropriate size in consideration of the possibility of an error in measurement and estimation. In addition, a plurality of threshold values may be preset, and in this case, correction amounts for estimated hydrogen concentrations or diffusion coefficients may be correspondingly preset in many steps, and thus the estimated hydrogen concentrations or the diffusion coefficients may be corrected in a stepwise manner based on levels of a difference between a calculated hydrogen supply amount and an estimated hydrogen use amount.

In the correcting of an estimated hydrogen concentration (S800), a diffusion coefficient of the diffusion equation according to crossover may be corrected. In other words, the diffusion coefficient used in the diffusion equation may be corrected to more accurately estimate a hydrogen concentration. Specifically, a diffusion coefficient of the diffusion equation according to crossover may be corrected to further increase as a difference between a calculated hydrogen supply amount and an estimated hydrogen use amount is increased. When an estimated hydrogen use amount is less than the calculated hydrogen supply amount, an amount of hydrogen crossover may be increased due to deterioration of a fuel cell stack or the like. Therefore, as the difference between a calculated hydrogen supply amount and an estimated hydrogen use amount increases, a greater correction of the diffusion coefficient in the diffusion equation is required. Further, an actual amount of hydrogen crossover is greater than an estimated amount of hydrogen crossover and thus, the amount of hydrogen crossover should be estimated to be greater. Therefore, a diffusion coefficient may be corrected to be increased. In the determining of whether a difference between a calculated hydrogen supply amount and an estimated hydrogen use amount is greater than a preset threshold value, when the difference is equal to or less than the preset threshold value, the diffusion coefficient may be maintained to the existing value (S900).

Figure 4:
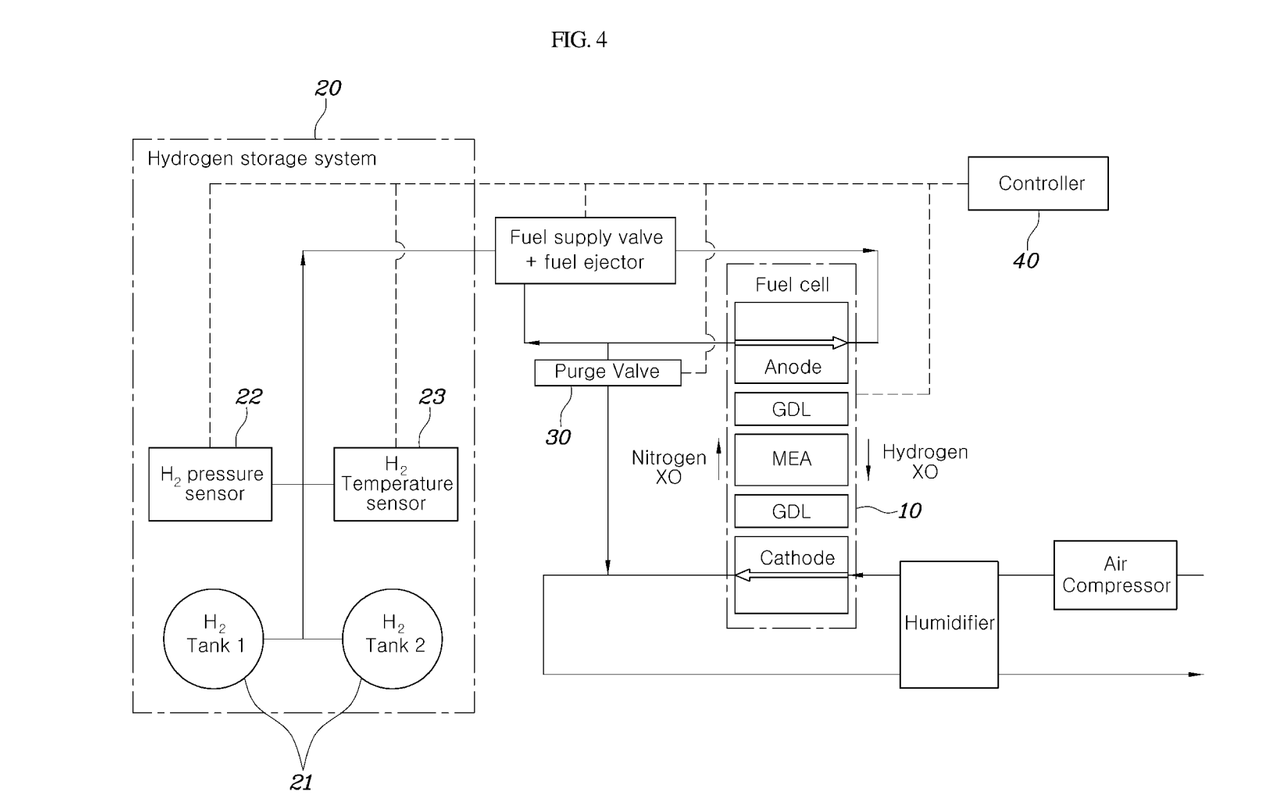
FIG. 4 is a configuration diagram illustrating a system for controlling hydrogen purging of a fuel cell according to an exemplary embodiment of the present invention.

FIG. 4 is a configuration diagram illustrating a system for controlling hydrogen purging of a fuel cell according to an exemplary embodiment of the present invention. Referring to FIG. 4, a system for controlling hydrogen purging of a fuel cell according to an exemplary embodiment of the present invention may include: a hydrogen purge valve 30 disposed in a hydrogen recirculating line; and a controller 40 configured to operate the hydrogen purge valve 30 by estimating a hydrogen concentration. In particular, the controller 40 may be configured to calculate a hydrogen supply amount, estimate a hydrogen consumption amount, and correct an estimated hydrogen concentration when a difference between the calculated hydrogen supply amount and the estimated hydrogen use amount is greater than a predetermined threshold value.

A hydrogen storage system 20 may be configured to supply hydrogen to an anode side of a fuel cell 10. Specifically, the hydrogen storage system 20 may include a hydrogen tank 21, and alternately, a plurality of hydrogen tanks may be provided. Moreover, the hydrogen storage system 20 may further include a pressure sensor 22 configured to measure a pressure in the hydrogen tank 21 and a temperature sensor 23 configured to measure a temperature in the hydrogen tank 21, and the controller 40 may be configured to estimate a hydrogen storage amount in the hydrogen tank 21 based on information received from the sensors. The controller 40 may further be configured to estimate a hydrogen concentration and adjust the opening and closing of the hydrogen purge valve 30 to confine or maintain the hydrogen concentration within a suitable range. A description of the system for controlling hydrogen purging of a fuel cell overlaps with that of the control method and thus is omitted.

Although the present invention has been described and illustrated with reference to the exemplary embodiments thereof, it will be apparent to those skilled in the art that various improvements and modifications of the present invention may be made without departing from the technical idea of the present invention provided by the following claims.

What is claimed is:

1. A method for controlling hydrogen purging of a fuel cell by estimating a hydrogen concentration supplied to a fuel cell, comprising:
   detecting, by a controller, a deterioration of a fuel cell stack;
   in response to detecting the deterioration of the fuel cell stack, calculating, by the controller, a hydrogen supply amount as a change of the hydrogen amount stored in a hydrogen storage system to be estimated based on pressures and temperatures in the hydrogen storage system;
   estimating, by the controller a hydrogen consumption amount by summing an amount of hydrogen reacted in a fuel cell, an amount of hydrogen crossover, and an amount of hydrogen discharged by hydrogen purging;
   estimating, by the controller, a hydrogen concentration based on crossover levels and purging amounts of individual gases;
   correcting, by the controller, the estimated hydrogen concentration according to an amount of change of hydrogen crossover due to deterioration of the fuel cell stack when a difference between the calculated hydrogen supply amount and the estimated hydrogen consumption amount is greater than a predetermined threshold value,
   wherein the crossover is gas diffusion through a membrane from a hydrogen electrode to an oxygen electrode or vice versa in a fuel cell stack; and
   operating, by the controller, a hydrogen purge valve based on the corrected estimated hydrogen concentration to control the hydrogen purging of the fuel cell.

2. The method of claim 1, wherein the hydrogen concentration is estimated based on a diffusion equation according to crossover occurring in a fuel cell.

3. The method of claim 2, wherein the diffusion equation uses the following formulas:

$$n^*_{N2\_XO} = \frac{D_{N2}}{RT} \cdot \frac{P_{Ca,N2} - P_{An,N2}}{\delta} \cdot A; \text{ and}$$

$$n^*_{H2\_XO} = \frac{D_{H2}}{RT} \cdot \frac{P_{An,H2} - P_{Ca,H2}}{\delta} \cdot A,$$

wherein the symbols used are as follows: $n_{N2\_XO}^*$: Nitrogen crossover rate; $n_{H2\_XO}^*$: Hydrogen crossover rate; P: Pressure, [kPa]; R: Gas constant, 8.314 [J/mol/K]; T: Temperature, [K]; D: Diffusion coefficient; A: Catalyst area; and $\delta$: Diffusion distance.

4. The method of claim 2, wherein the correcting of the estimated hydrogen concentration is performed to correct a diffusion coefficient of the diffusion equation according to crossover.

5. The method of claim 1, wherein the calculating of the hydrogen supply amount is performed based on a storage amount in the hydrogen storage system.

6. The method of claim 5, wherein the hydrogen storage system includes a hydrogen tank.

7. The method of claim 5, wherein the calculating of the hydrogen supply amount and the estimating of the hydrogen concentration amount are performed respectively to calculate the hydrogen supply amount and estimate the hydrogen consumption amount during a period between a first storage amount and a second storage amount which are both pre-established in the hydrogen storage amount.

8. The method of claim 1, wherein the amount of hydrogen reacted in the fuel cell is estimated based on a generated current of the fuel cell.

9. The method of claim 1, wherein the amount of hydrogen crossover is estimated based on a diffusion equation.

10. The method of claim 9, wherein the diffusion equation uses the following formulas:

$$n^*_{N2\_XO} = \frac{D_{N2}}{RT} \cdot \frac{P_{Ca,N2} - P_{An,N2}}{\delta} \cdot A; \text{ and}$$

$$n^*_{H2\_XO} = \frac{D_{H2}}{RT} \cdot \frac{P_{An,H2} - P_{Ca,H2}}{\delta} \cdot A,$$

wherein the symbols used are as follows: $n_{N2\_XO}^*$: Nitrogen crossover rate; $n_{H2\_XO}^*$: Hydrogen crossover rate; P: Pressure, [kPa]; R: Gas constant, 8.314 [J/mol/K]; T: Temperature, [K]; D: Diffusion coefficient; A: Catalyst area; and $\delta$: Diffusion distance.

11. The method of claim 1, wherein the amount of hydrogen discharged by hydrogen purging is estimated based on a difference between a pressure of a hydrogen supply line and an external pressure and on an estimated hydrogen concentration.

12. The method of claim 11, wherein the diffusion coefficient of the diffusion equation according to crossover is corrected to further increase as a difference between the calculated hydrogen supply amount and the estimated hydrogen consumption amount increases.

* * * * *